US012563136B2

(12) United States Patent
Benavidez et al.

(10) Patent No.: US 12,563,136 B2
(45) Date of Patent: Feb. 24, 2026

(54) MEANS FOR SUPPORTING A MOBILE DEVICE IN FRONT OF A WIRELESS FRESNEL LENS

(71) Applicant: ORC TECH, LLC, Albuquerque, NM (US)

(72) Inventors: Joshua Benavidez, Albuquerque, NM (US); John Chavez, Albuquerque, NM (US)

( * ) Notice: Subject to any disclaimer, the term of this patent is extended or adjusted under 35 U.S.C. 154(b) by 355 days.

(21) Appl. No.: 18/137,906

(22) Filed: Apr. 21, 2023

(65) Prior Publication Data

US 2023/0379406 A1 Nov. 23, 2023

Related U.S. Application Data

(60) Provisional application No. 63/333,547, filed on Apr. 21, 2022.

(51) Int. Cl.
H04M 1/04 (2006.01)
H01Q 15/02 (2006.01)

(52) U.S. Cl.
CPC .............. H04M 1/04 (2013.01); H01Q 15/02 (2013.01)

(58) Field of Classification Search
CPC ....... H04M 1/04; H01Q 15/02; H01Q 1/1235; H01Q 19/065
See application file for complete search history.

(56) References Cited

U.S. PATENT DOCUMENTS

| | | | | |
|---|---|---|---|---|
| 6,075,200 A | * | 6/2000 | O'Neill .................. | F24S 23/31 |
| | | | | 136/246 |
| 8,384,614 B2 | * | 2/2013 | Kennedy ................. | H01Q 1/08 |
| | | | | 343/915 |
| 11,722,166 B2 | * | 8/2023 | Cunningham ....... | A45C 11/002 |
| | | | | 455/575.8 |
| 11,770,150 B2 | * | 9/2023 | Feng ..................... | A45C 11/00 |
| | | | | 455/575.8 |
| 11,792,311 B2 | * | 10/2023 | Griffith ................. | G03B 21/28 |
| | | | | 455/556.1 |
| 2012/0081265 A1 | * | 4/2012 | Kennedy ................. | H01Q 1/08 |
| | | | | 343/909 |
| 2019/0375670 A1 | * | 12/2019 | Altaras ................. | C03B 17/062 |
| 2021/0301976 A1 | * | 9/2021 | Cohen ..................... | H04M 1/04 |
| 2023/0375758 A1 | * | 11/2023 | Benavidez .......... | H01Q 1/1264 |
| 2023/0379406 A1 | * | 11/2023 | Benavidez .......... | H01Q 19/065 |

* cited by examiner

*Primary Examiner* — Md K Talukder
(74) *Attorney, Agent, or Firm* — KPPB LAW; Luis M. Ortiz; Kermit D. Lopez

(57) ABSTRACT

A mobile device holder can be provided that includes a screen having a center and a perimeter, a means to retain a mobile device at the center of the screen, a mobile device holder support member defining an outer perimeter of the screen, and conical shape supports configured to create and hold a conical shape of the screen from the perimeter to the center. The mobile device holder support member can be configured to interfaced with a support member associated with a Fresnel lens having a center defined by non-conductive material surrounded by conductive material and position the means to retain a mobile device away from the Fresnel lens when the mobile device support member is interfaced with the support member.

17 Claims, 10 Drawing Sheets

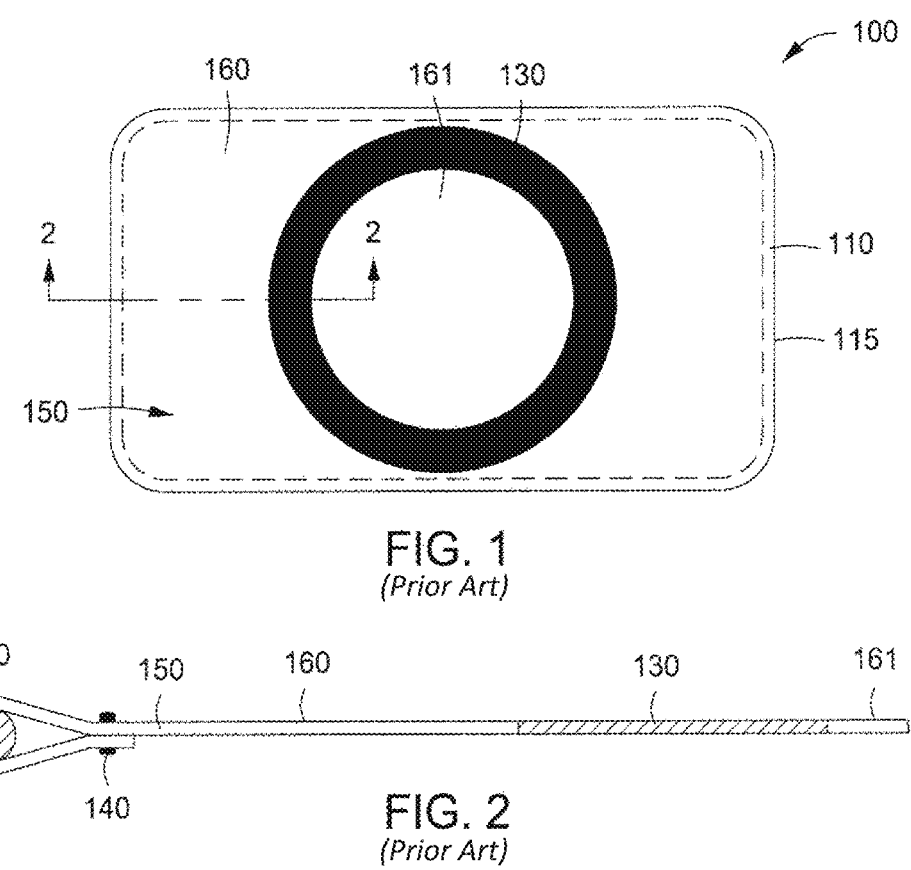
FIG. 1
*(Prior Art)*
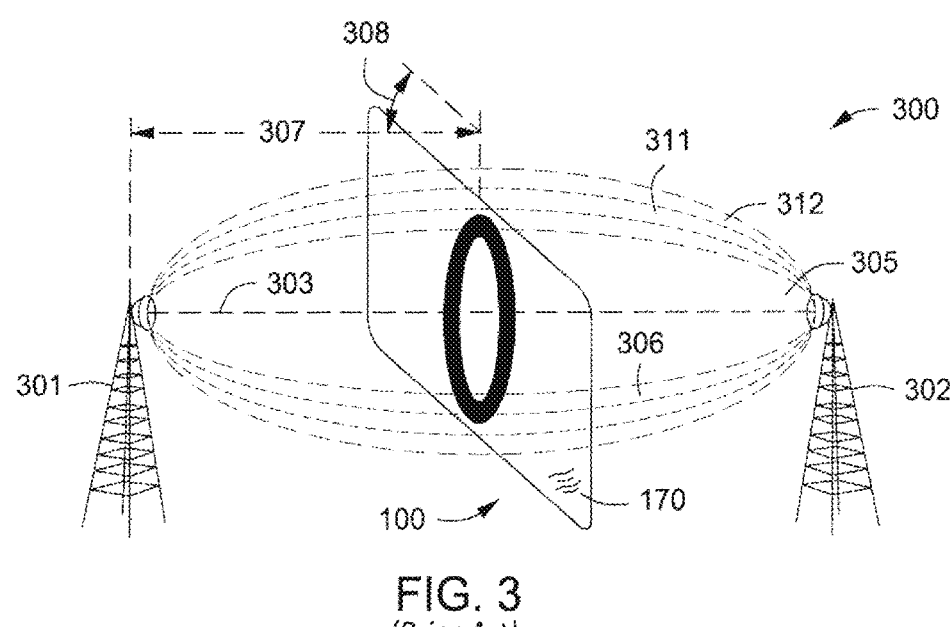
FIG. 2
*(Prior Art)*
FIG. 3
*(Prior Art)*

FIG. 10A                      FIG. 10B

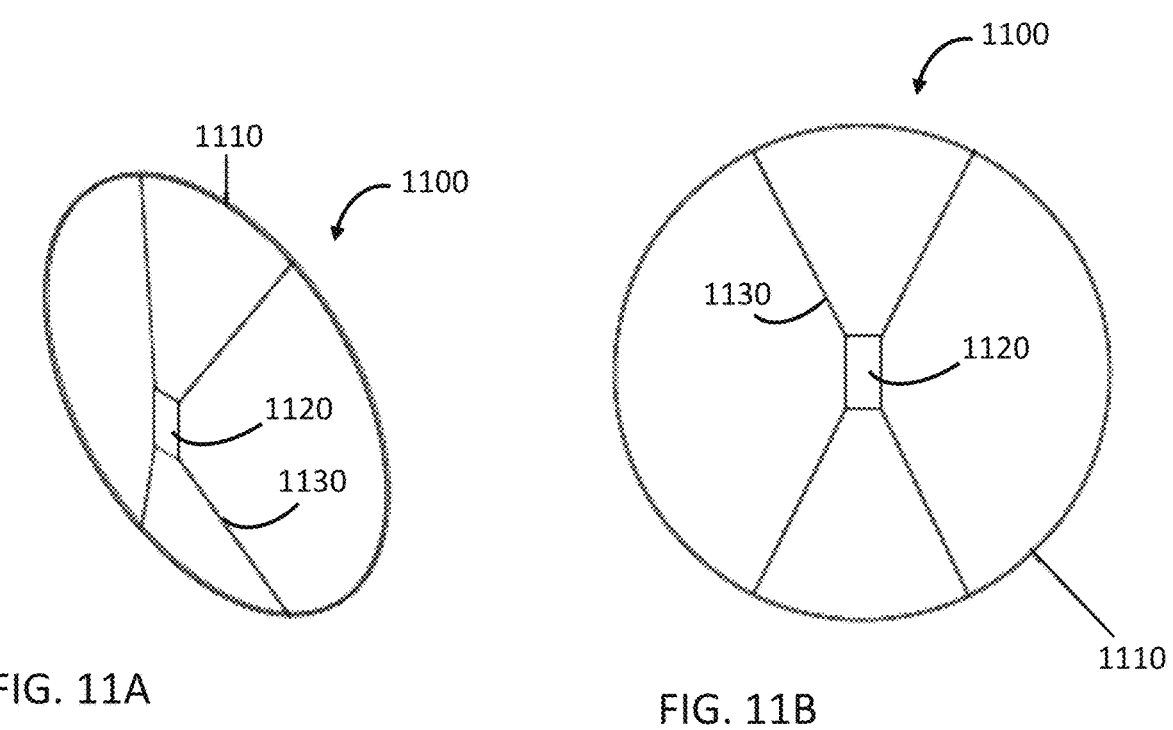
FIG. 11A
FIG. 11B
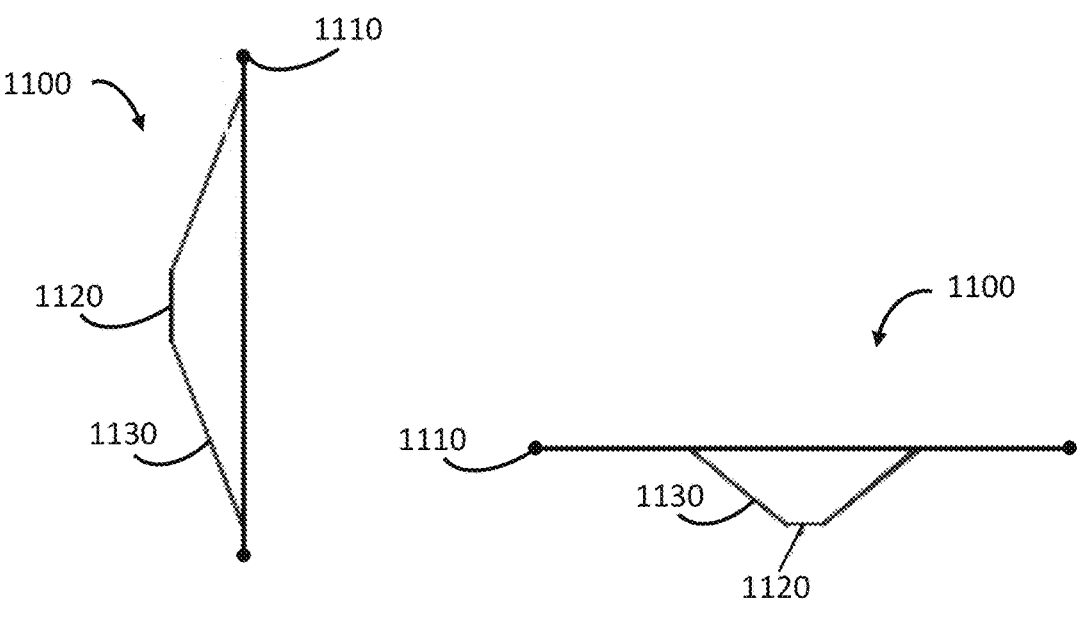
FIG. 11C
FIG. 11D

MEANS FOR SUPPORTING A MOBILE DEVICE IN FRONT OF A WIRELESS FRESNEL LENS

INVENTION PRIORITY

The present application claims priority as a continuation of U.S. Provisional Application No. 63/333,547, filed Apr. 21, 2022 and entitled "Means For Supporting A Mobile Device In Front Of A Wireless Frensel Lens", which is herein incorporated by references in its entirety.

TECHNICAL FIELD

The embodiments described herein are generally related to systems and methods for enhancing wireless communications by improving wireless gain. More particularly, the embodiments are related to infrastructure supporting a mobile device in front of a wireless Fresnel lens as a signal enhancement to improve wireless communications of communications equipment including wireless portable electronic devices.

BACKGROUND

In U.S. Pat. No. 8,384,614 B1 ("614 patent"), issued Feb. 26, 2013, National Aeronautics and Space Administration (NASA) inventors disclosed a means to address the need for improved signal communications systems and for an improved Fresnel lens to increase the signal to noise ratio (SNR) ratio in wireless communication links, thereby improving the range and performance of wireless devices. The '614 patent details how to solve address these needs using an improved Fresnel lens, which basically utilizes concepts of a Fresnel lens and incorporate them for use between wireless communications transmitters and receivers as an antenna enhancement to pass wanted signals while suppressing or eliminating unwanted signals. The '614 patent in incorporated herein by reference in its entirety for its teaching.

NASA inventors found that portable, wireless communication devices often require an increased SNR. The need can arise from increased range, higher data rates, and compromised channels—e.g., RF interference and rain fade. Increased SNR can also be required in urban environments because of urban blockage, either on foot or in an automobile, where buildings and materials cause exacerbated fading conditions. Natural disasters can further diminish the operational effectiveness of traditional methods of communication thereby creating a need for increased SNR. For example, hurricanes and earthquakes can damage transmission links, such as mobile phone towers, requiring an increased range of communication for remaining undamaged communication links to maintain geographic coverage. Highly critical government communication applications can also require increased SNR. Individuals, such as boaters, hunters, campers, or stranded motorists, would benefit from an increase in the SNR of their wireless portable communication devices, such as radios, pagers, and mobile phones.

Despite the brilliant teachings of the '614 patent, a need still exists for improved means to effectively support the deployment of Fresnel lenses as an antenna transmission/receiving enhancement and improve the effectiveness of communications equipment, and thereby also improving the range and performance of wireless portable electronic devices.

SUMMARY OF THE EMBODIMENTS

An apparatus and method for supporting a mobile device in front of a Fresnel lens operating as a passive enhancement for antennas associated with electronic communications devices and enhancing the gain of wireless signals by antennas, such as the Fresnel lens taught by the '614 patent, is described.

In a first embodiment, a mobile device holder can be provided that includes a screen material having a center and a perimeter, a means to retain a mobile device at the center of the screen, a mobile device holder support member defining an outer perimeter of the screen, and conical shape supports configured to create and hold a conical shape of the screen from the perimeter to the center. The mobile device holder support member can be configured to interface with a support member associated with a Fresnel lens having a center defined by electrically non-conductive material surrounded by electrically conductive material and position the means to retain a mobile device away from the Fresnel lens when the mobile device support member is interfaced with the support member.

In accordance with another embodiment, a mobile device holder can be provided that includes a screen having a center and a perimeter, a means to retain a mobile device at the center of the screen, a mobile device holder support member defining an outer perimeter of the screen, and conical shape supports configured to create and hold a conical shape of the screen from the perimeter to the center. The mobile device holder support member can be configured to interface with a support member associated with a Fresnel lens having a center defined by non-conductive material that is surrounded by conductive material. The means to retain a mobile device can be positioned away from the Fresnel lens when the mobile device support member is interfaced with the support member.

In accordance with another embodiment, the screen can be collapsed for storage by twisting the mobile device holder support member in opposite screw senses to form interleaved concentric sections.

In accordance with another embodiment, the screen can be provided in the form of at least one of a circle, square, rectangle.

In accordance with another embodiment, the screen can be made from non-conductive fabric.

In accordance with another embodiment, the mobile device holder support member can be made from spring metal.

In accordance with another embodiment, the conical shape supports can be made from spring metal.

In accordance with another embodiment, the conical shape supports can be provided in the shape of rods.

In accordance with another embodiment, a mobile device holder can be provided that includes a screen having a center and a perimeter, a means to retain a mobile device at the center of the screen, a mobile device holder support member defining an outer perimeter of the screen, and conical shape supports configured to create and hold a conical shape of the screen from the perimeter to the center. The mobile device holder support member can be configured to interfaced with a support member associated with a Fresnel lens having a center defined by electrically non-conductive material surrounded by electrically conductive material and position the means to retain a mobile device away from the Fresnel lens when the mobile device support member is interfaced with the support member.

In at least one other specific embodiment, the method for enhancing the gain of a wireless signal by a mobile device can include activating a wireless communication link to produce a wireless signal. The method can also include placing a Fresnel lens in the transmission path and then securing a mobile device within a mobile device holder in front and center of the Fresnel lens. The Fresnel lens can include a screen having one or more electrically conductive regions for reflecting electromagnetic radiation and one or more non-conductive regions for permitting electromagnetic radiation therethrough. The one or more electrically conductive regions can be disposed adjacent to at least one of the one or more non-conductive regions. The Fresnel lens can also include two support members disposed about two separated portions of the screen. A ratchet mechanism integrated with the support members couple to the Fresnel lens and enable the Fresnel lens to be rotated back and forth to achieve optimum operation. The screen can be capable of collapsing by twisting the support member in opposite screw senses to form interleaved concentric sections. The method can also include amplifying the wireless signal to the mobile device positioned in front of the Fresnel lens by using the Fresnel lens for cancelling out at least a portion of one or more out-of-phase regions of the wireless signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1, labeled as prior art, depicts a side view of an illustrative Fresnel lens.

FIG. 2, labeled as prior art, depicts a partial cross-sectional view of the Fresnel lens depicted in FIG. 1 along line 2-2.

FIG. 3, labeled as prior art, depicts a schematic diagram of an illustrative communication link utilizing the Fresnel lens depicted in FIG. 1.

FIGS. 10A, 10B, and 10C depict top, front, and top right perspectives of support structure for a Fresnel lens, according to one or more embodiments described.

FIGS. 11A, 11B, 11C, and 11D depict top right, front, right, and top perspectives of a mobile device holder, according to one or more embodiments described.

DETAILED DESCRIPTION

Figures 4, 5, 6:
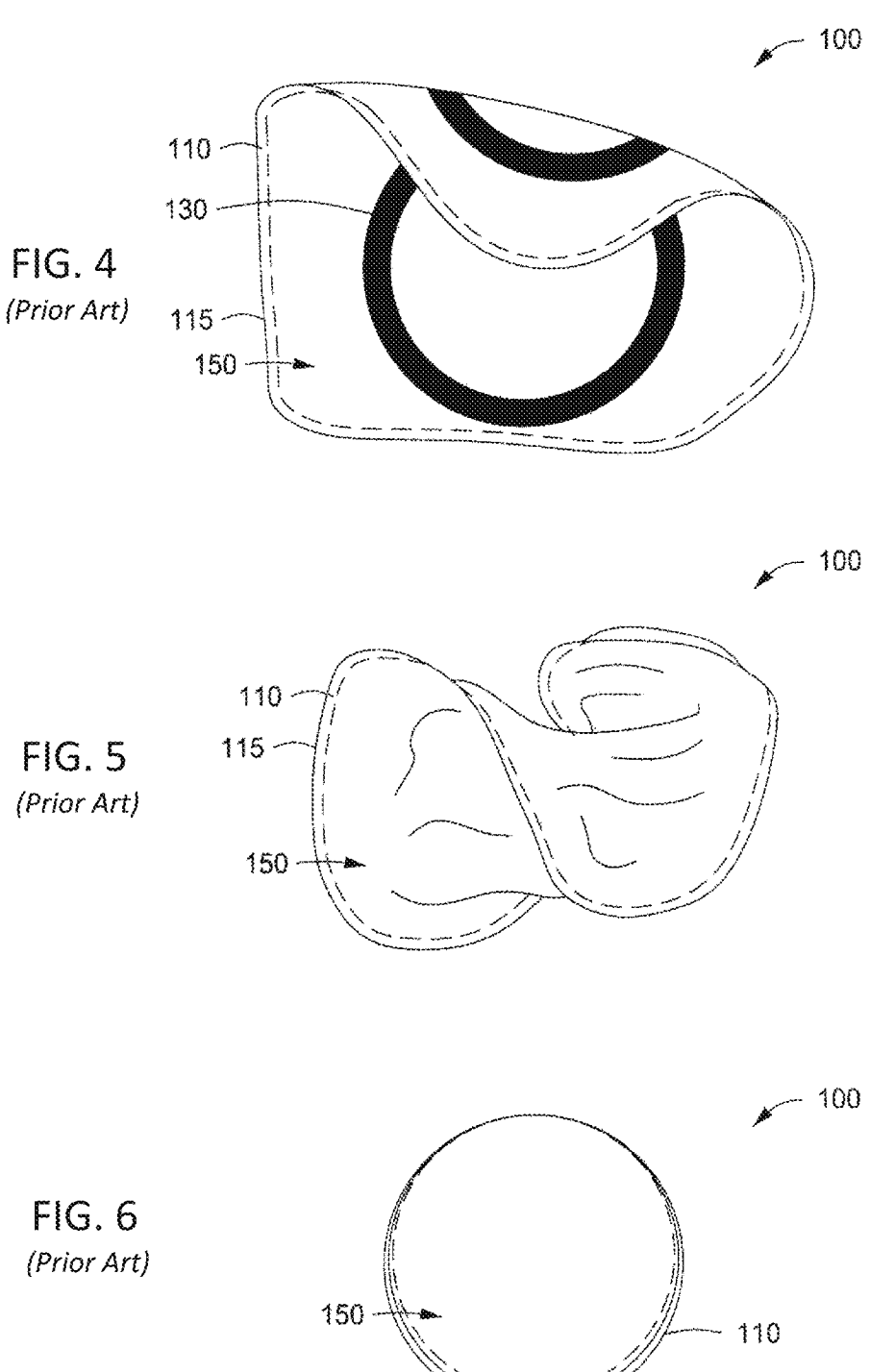
FIG. 4, labeled as prior art, depicts a side view of the Fresnel lens depicted in FIG. 1 in a partially folded configuration.
FIG. 5, labeled as prior art, depicts a side view of the Fresnel lens depicted in FIG. 1 in a partially collapsed configuration.
FIG. 6, labeled as prior art, depicts a side view of the Fresnel lens depicted in FIG. 1 in a compact configuration.

A detailed description will now be provided. Each of the appended claims defines a distinct embodiment of the invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims. Each of the embodiments will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Reference to "Fresnel lens" throughout this detailed description should be interpreted to refer to a passive enhancement for antennas associated with electronic communications devices and enhancing the gain of wireless signals received by the antennas, such as the Fresnel lens taught by the '614 patent. FIGS. 1-7 provide background on the Fresnel lens and its operation. FIGS. 8-11 describe improvements for effective deployment and use of the Fresnel lens, in accordance with one or more of the embodiments of the invention.

Referring to FIG. 1, labeled as prior art, depicted is a front view of an illustrative Fresnel lens or Fresnel zone plate 100. As used herein, the term "lens" can refer to any three-dimensional structure, through which electromagnetic waves can pass and that uses either refraction or diffraction to control the exiting aperture distribution as a function of its position and shape. As used herein, the terms "Fresnel lens" or "Fresnel zone plate" can refer to a type of lens that produces focusing and imaging of electromagnetic waves using diffraction, rather than refraction. It is noted that a lens and hence, a Fresnel lens, are not antennas. An antenna is a transducer that transmits or receives electromagnetic waves. Conversely, a Fresnel lens does not transmit or receive electromagnetic waves. A Fresnel lens operates more like a filter when it comes to wireless electromagnetic waves. As stated above and as will be discussed in more detail supra, electromagnetic waves are passed through a Fresnel lens wherein said electromagnetic waves may be focused into Fresnel zone regions.

The Fresnel lens 100 can include one or more screens 150. As used herein, the term "screen" refers to a monolithic body, sheet, or membrane having a thickness that is less than its length and width. The screen 150 can have any shape or combination of geometrical shapes. The shape of the screen 150 can be symmetric or asymmetric. Illustrative shapes can include, but are not limited to, square, rectangular, triangular, circular, elliptical, pentagonal, hexagonal, other polygonal shapes, non-uniform shapes, or a combination thereof. The screen 150 shown in FIG. 1 is rectangular, which has a length longer than its width, a width longer than its length. If provided in the form of a square, the width and length can be equal. The screen 150 can be formed of a deformable and/or flexible material or fabric. As used herein, the term "deformable" refers to the ability of the material or fabric to twist, bend, flex, turn, and/or change shape. The screen 150 can have a total thickness ranging from a low of about 0.01 mm, about 0.5 mm, about 1.5 mm, or about 2.5 mm to a high of about 4 mm, about 7.5 mm, or about 10 mm. The screen 150 can also have a total thickness of from about 0.25 mm to about 8 mm, from about 1 mm to about 6 mm, or from about 2 mm to about 5 mm.

The screen 150 can have one or more electrically conductive regions 130 and one or more non-conductive regions (two are shown 160, 161). The one or more electrically conductive regions 130 can be disposed adjacent to at least one of the non-conductive regions 160, 161. The one or more electrically conductive regions 130 can be a ring shaped conductive region and can be disposed between an inner non-conductive region 161 and an outer non-conductive region 160. As used herein, the term "conductive" is used interchangeably with the term "electrically conductive." The electrically conductive region 130 can be woven into or otherwise disposed within the screen 150. In another example, the electrically conductive region 130 can be formed by disposing an electrically conductive material or layer on a surface of the screen 150, attaching the electrically conductive material or layer to the surface of the screen 150, embedding the electrically conductive material at least partially within the screen 150, or any combination thereof.

The outer non-conductive region 160 and the inner non-conductive region 161 can be formed by disposing a non-conductive material or layer on the surface of the screen 150, attaching a non-conductive or insulating material to the surface of the screen 150, embedding the non-conductive material at least partially within the screen 150, or any combination thereof, where the screen 150 is non-conductive. Alternatively, the outer non-conductive region 160 and the inner non-conductive region 161 can be or can include the portion of the screen 150 that does not include the electrically conductive region 130.

The electrically conductive material used in the electrically conductive region 130 can be made of or include an electrically conductive fabric, which can include any kind of electronic textile or "e-textile". E-textiles can include any textile that can be applied to the physical manipulation of electrical or electromagnetic signals or radiation; most often, this is associated with devices that incorporate one or more electronic devices. Electronic textiles can provide several advantages for portable Fresnel lenses and applications thereof. Electronic textiles are often lightweight with low mass. In addition, they can be both foldable and flexible. E-textiles may be constructed from materials that are resistant to the elements and/or extreme environments. For example, NOMEX®, having excellent thermal, chemical, and radiation resistance, can be used as a base nonconductive e-textile material element. As such, when electrically conductive region 130 includes e-textiles, the Fresnel lens 100 can be lightweight, low mass, foldable, flexible, and/or resistant to the elements. Metals that can be used in the construction of electronic textiles can include, but are not limited to, copper, nickel, gold, silver, steal, zinc, tin, tungsten, iron, iridium, aluminum, alloys thereof, or other conductive elements. Metalized fiber strands can include polymers coated with metal. Other conducting fabric strands can include electrically conducting polymers or plastics. Electronic textiles can include multiple metalized fibers wrapped together to form electrically conductive strands. Electronic textiles can include nano-tubes or other nano-particles that have advanced electronic function. In another embodiment, the electrically conductive region 130 can be made using metal meshes, such as a copper wire or gold wire mesh.

Just as there can be many different means to creating conductive fabrics for use with c-textiles, numerous non-conductive materials can be used in conjunction with the aforementioned conductive materials. Suitable non-conductive materials can include, but is not limited to, nylon, NOMEX®, KEVLAR®, aromatic polyamide polymers, polyester, cotton, Rip-stop nylon, canvas, other common textiles or materials having bulk electrical properties fitting the description a good non-conductor, or combinations thereof. The non-conductive material can be in the form of a web having air or a vacuum dispersed through non-conductive strands.

The conductivity of the electrically conductive region 130 and conductivity of the non-conductive region 160 can be reversed. For example, the electrically conductive region 130 can be a non-conductive region made of non-conductive fabric, and the non-conductive regions 160, 161 can be conductive regions made of all or mostly conductive fabric. The non-conductive regions can also be the same material with the conductive region affixed near the center of the material defining the non-conductive regions after its placement.

The Fresnel lens 100 can further include a support member 110 that can be at least partially disposed about the screen 150. The support member 110 is preferably located about or along a perimeter 115 of the screen 150 to provide support or rigidity to the screen 150. The support member 110 can be a single component or body or can include multiple pieces or sections that are joined together. In one embodiment, the support member 110 is a single component that makes a complete loop, i.e., the support member 110 is connected at a first and second end thereof. Because the screen 150 is flexible and deformable, the shape of the support member 110 disposed about the perimeter 115 can define the shape of the Fresnel lens 100. In addition, the support member 110 can stretch the screen 150 and can keep it substantially flat or planar.

The screen 150 and therefore, the Fresnel lens 100 can be configured to be deployable. The term "deployable" as used herein refers to the ability of the screen and therefore, the Fresnel lens, to spread out or extend. The screen 150 and therefore, the Fresnel lens 100 can have an open, extended, spread out, or un-collapsed configuration, where the open configuration of the screen 150 and therefore, the Fresnel lens 100 can have a plurality of shapes, including, but not limited to, generally circular, generally elliptical, generally square, generally triangular, or other shape as required to suit an application or function in which it is used. For example, the Fresnel lens 100 can be non-planar having spherical or parabolic shape. As depicted in FIG. 1, in the open configuration the Fresnel lens 100 can have a generally rectangular shape. For example, the Fresnel lens 100 can have two sets of substantially parallel sides with four interconnecting curved corners. The Fresnel lens 100 can also be configured to be portable, i.e., easily carried or packed away. In one embodiment, the Fresnel lens 100 can be a low weight and/or low mass device. For example, the Fresnel lens 100 can have a mass ranging from a low of about 0.05 kg to a high of about 5 kg.

Referring to FIG. 2, labeled as prior art, depicted is a partial cross-sectional view of the Fresnel lens 100 depicted in FIG. 1 along line 2-2. One or more layers of the screen 150 can be secured to the support member 110. The screen 150 can be secured to the support member 110 by wrapping the screen 150 around the support and fastening a portion of the screen 150 to another portion of the screen 150 or to the support member 110. The screen 150 can be fastened to itself or the support member 110 using any suitable fastener or combination of fasteners 140. Illustrative fasteners can include, but are not limited to, adhesives, thread, brackets, staples, epoxy, rivets, clamps, or any combination thereof. In one embodiment, the support member 110 can be sewn into at least a portion of the screen 150 using a thread as the fastener 140. The support member 110 can be formed of a spring-like material. A spring-like material may be described as any elastic body or device that recovers its original shape when released after being distorted. The spring-like material of the support member 110 can be deformable and can be conductive, non-conductive, or partially conductive and partially non-conductive. For example, the spring-like material can include, but is not limited to, plastic, metal, rubber, fiber, fiberglass, carbon, carbon-glass composites, or a combination thereof. Other materials that can be used in the support member include shape memory allows, shape memory polymers, or a combination thereof. The support member 110 can include, but is not limited to, a circular cross-section, an elliptical cross-section, a square cross-section, a rectangular cross-section, a triangular cross section, polygonal cross-section, and any other cross-sectional shape or combination thereof. With the ability to collapse into a smaller form, the Fresnel lens 100 can also be easily carried or packed away in, for example, a backpack.

FIG. 3, labeled as prior art, depicts a schematic diagram of an illustrative communication link 300 utilizing the Fresnel lens 100 depicted in FIG. 1, according to one or more embodiments. The communication link 300 can include both a transmitting or transmission source 301 and a receiver 302, with a transmission path 303 formed therebetween. In operation, the Fresnel lens 100 through its one or more screens can cancel or block at least a portion of an out-of-phase radiated field produced by the transmission source 301, at any instant of time, passing through a planar cut that is orthogonal to the transmission path 303. The cancellation of the out-of-phase radiation can be accomplished by insertion of the electrically conductive region 130 of the Fresnel lens' 100 one or more screens, such that it blocks or covers one or more Fresnel zone regions (four Fresnel zone regions are shown 305, 306, 311, 312) at a predetermined distance 307 from the transmission source 301 in the transmission path 303. The shape and location of four Fresnel zone regions are depicted diagrammatically as 305, 306, 311, and 312. Fresnel zones are inherent to all wireless communication links. Any transmission from a source or transmitter, such as the transmission source 301, can produce both in-phase and out-of-phase radiation defined by Fresnel zones. Fresnel zones can be concentric ellipsoids of revolution that define volumes of in-phase and out-of-phase radiation from the transmission source 301.

The in-phase radiation can be defined by a first Fresnel zone region 305 and a third Fresnel zone region 311, and the out-of-phase radiation can be defined by a second Fresnel zone region 306 and a fourth Fresnel zone region 312. As shown, the first Fresnel zone region 305 can bound in-phase radiation and the second Fresnel zone region 306 can bound out-of-phase radiation. Placing the Fresnel lens 100 at the predetermined distance 307 and at a predetermined angle 308 relative to a transmission or receiver source can result in gain enhancement, focusing of radiated energy from the transmission source 301, signal improvement at the receiver 302 relative to that of a communication link without the Fresnel lens 100, or any combination. This result can be accomplished, at least in part, by cancelling the out-of-phase radiation in Fresnel zone region 306. The predetermined angle 308 may be any angle whereby the Fresnel lens 100 is orthogonal to the transmission path. For example, the electrically conductive region 130 can diffract, reflect, interfere with, block, or cancel out the out-of-phase radiation in Fresnel zone 306 to enhance transmission gain and improve SNR in the communication link 300. As such, the Fresnel lens 100 does not require a direct wired connection to the transmission source 301 nor a source of power, i.e., a plug or battery, to perform gain enhancement in the communication link 300.

FIGS. 4-6 show at least one embodiment for collapsing the Fresnel lens 100 into a reduced volume or a compact configuration. One method of collapsing the Fresnel lens 100 can comprise grasping the support member 110 with the screen 150 attached thereto at its extreme or opposing ends or points, twisting the ends in opposite screw senses while simultaneously bringing the ends toward each other. Opposite screw senses as used herein refers to rotation in opposite directions.

FIG. 4 depicts a side view of the Fresnel lens 100 depicted in FIG. 1 in a partially folded configuration, according to one or more embodiments. As the ends are twisted together, the Fresnel lens 100 can be partially folded on itself, as depicted.

FIG. 5 depicts a side view of the Fresnel lens 100 depicted in FIG. 1 in a partially collapsed configuration, according to one or more embodiments. As the ends are twisted further, the Fresnel lens 100 can begin to collapse into a spiral looking shape as depicted in FIG. 5.

FIG. 6 depicts a side view of the Fresnel lens 100 depicted in FIG. 1 in a compact or closed configuration, according to one or more embodiments. Once the ends are completely twisted and folded, the folds of the Fresnel lens 100 can be formed into a number of interleaved sections consisting of generally circular loops. The generally circular loops can be pressed down to form the compact configuration shown in FIG. 6. The Fresnel lens 100 can easily and conveniently collapse into the compact configuration for storage when not in use, as is illustrated in FIG. 6. The general structure and method of collapsing as illustrated in FIGS. 4-6 can be utilized for the Fresnel lenses 400, 500, and/or 600, as well. An alternative method of collapsing the Fresnel lenses can involve one or more folds along predete mined creases.

The Fresnel lens 100 can have a plurality of shapes in the compact configuration, including, but not limited to, generally polygonal, generally elliptical, generally square, generally triangular, or other shape as required. As depicted in FIG. 6, the Fresnel lens 100 can have a generally circular shape in the compact configuration. The shape of the Fresnel lens 100 in the compact configuration can depend, at least in part, on the shape required for the un-collapsed configuration and the manner in which the Fresnel lens 100 is folded.

Figure 7:
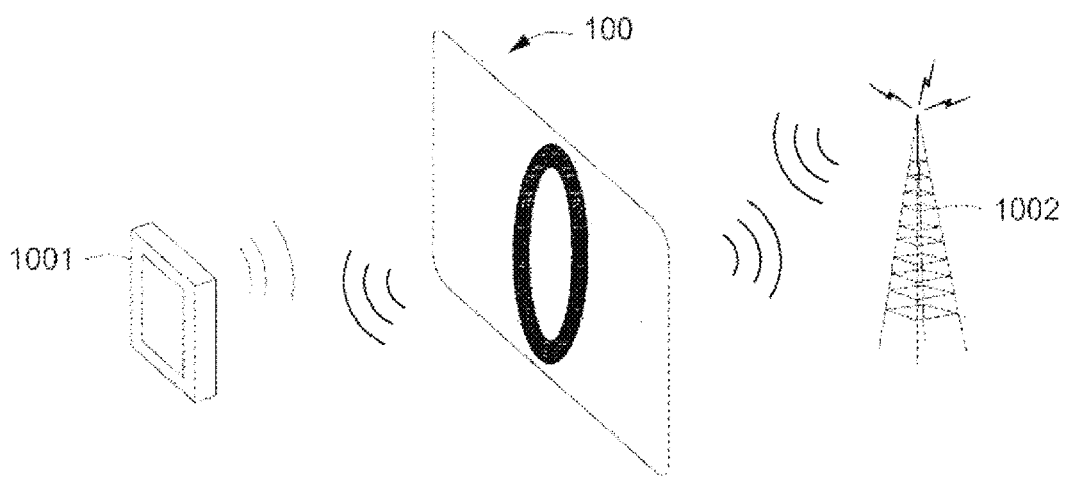
FIG. 7, labeled as prior art, depicts a schematic diagram of an illustrative wireless device utilizing the Fresnel lens depicted in FIG. 1 to enhance the gain of one or more signals sent to and from the wireless device, according to one or more embodiments described.

FIG. 7 depicts a schematic diagram of an illustrative wireless device 1001 placed proximate to a Fresnel lens 100 or in a predetermined Fresnel zone region to enhance the gain of a signal transmitted from the wireless device 1001 (e.g., a cellular phone, smartphone, tablet, laptop, IoT device) as well as to enhance the gain of a signal received by the wireless device 1001 which has been transmitted by one or more transceivers 1002 (e.g., a cell phone tower, a wireless router, etc.), according to one or more embodiments. As described infra, placing the Fresnel lens 100 at a predetermined distance and at a predetermined angle relative to a transmission or receiver source can result in gain enhancement, focusing of radiated energy from the transmission source, signal improvement at the receiver relative to that of a communication link without the Fresnel lens, or any combination. FIG. 7 also illustrates the distinction that the Fresnel lens 100 is not an antenna. Antennas are operably integrated on the one or more wireless devices 1001 and the one or more transceivers 1002. FIG. 7 also illustrates the fact that no direct wire connection(s) are required between the Fresnel lens 100 and the one or more wireless devices 1001. The Fresnel lens 100 can be used to enhance the signal gain of one or more wireless devices 1001 transmitted to one or more transceivers 1002. Further, the Fresnel lens 100 can be used to enhance the signal gain of one or more transceivers 1002 transmitted to one or more wireless devices 1001. The wireless devices 1001 can include, but are not limited to, mobile phones, smartphones, tablet devices, personal digital assistants (PDA), cameras, global positioning systems (GPS), wireless adapters or PCI cards for computing devices (e.g., Bluetooth® or 802.11 devices), radios, transmitters, Internet of Things (IoT) devices, or any combination thereof.

As mentioned in the description with respect to FIG. 3, placing the Fresnel lens 100 at the predetermined distance 307 and at a predetermined angle 308 relative to a transmission or receiver source can result in gain enhancement, focusing of radiated energy from the transmission source 301, signal improvement at the receiver 302 relative to that of a communication link without the Fresnel lens 100, or any combination. The predetermined angle 308 may be any angle whereby the Fresnel lens 100 is orthogonal to the transmission path. What is now needed are means to achieve optimal placement of the Fresnel lens 100 with regards to the predetermined angle. What is also needed are means to manipulate orientation of the Fresnel lens 100 in scenarios where the device does not remain in a fixed location, which would be the case with wireless portable electronic devices 1001 carried by a user in the field (e.g., hiker, camper, hunter, workers, etc.). Manipulating the orientation of the Fresnel lens will likely be directly physically and randomly by a user of a wireless device 1001 until the user is satisfied with the signal strength being obtained by the wireless device 1001 via signal enhancement provided the Fresnel lens 100.

Referring to FIGS. 8A-8D, illustrated are top right (FIG. 8A), front (FIG. 8B), right (FIG. 8C), and top (FIG. 8D) perspectives of a support structure 800 for a Fresnel lens 100, according to one or more embodiments described. Note that Fresnel lens 100 is depicted in the shape of a circle in FIGS. 8A-8D. Two half-circle support structures 801/802 can enable a fully deployed Fresnel lens 100 to be supported upright when on a surface 899 (e.g., ground, table, automobile hood or roof). Right ring clamp 811 and left ring clamp 812 can hold and secure the Fresnel lens 100 at two opposing points 813/814 along support member 110 of Fresnel lens 100. The ring clamps 811/812 can be adapted with additional hardware (further described in FIGS. 9-10) that supports rotational movement of the Fresnel lens as shown by arrow 830 within the Fresnel lens' supported position between the half-circle support structures 801/802. The half-circle support structures 801/802 can be made from spring-like material, like that described for the support member 110 that forms the perimeter of the Fresnel lens 100 (see FIG. 2). Steel spring-like material can enable the half-circle support structures 801/802 to flex and easily store with the Fresnel lens 100. Magnetic anchors 815 can be provided at each end of the half circle support structures 801/802. The magnetic anchors 815 can facilitate attaching the support structure 800 to metal surfaces such as the hood or roof of a motor vehicle or other metallic objects serving as the surface 899. The magnetic anchors 815 from each support structure 801/802 can also be attached to each other, which can allow each support structure 801/802 of support assembly 800 to collapse into a smaller profile for compact storage along with the Fresnel lens 100. Alternatively, suction cups can be substituted for the magnetic anchors 815 to facilitate attaching the support structure 800 onto a smooth surface such as glass, or a smooth painted surface such as a car hood.

Figure 8A:
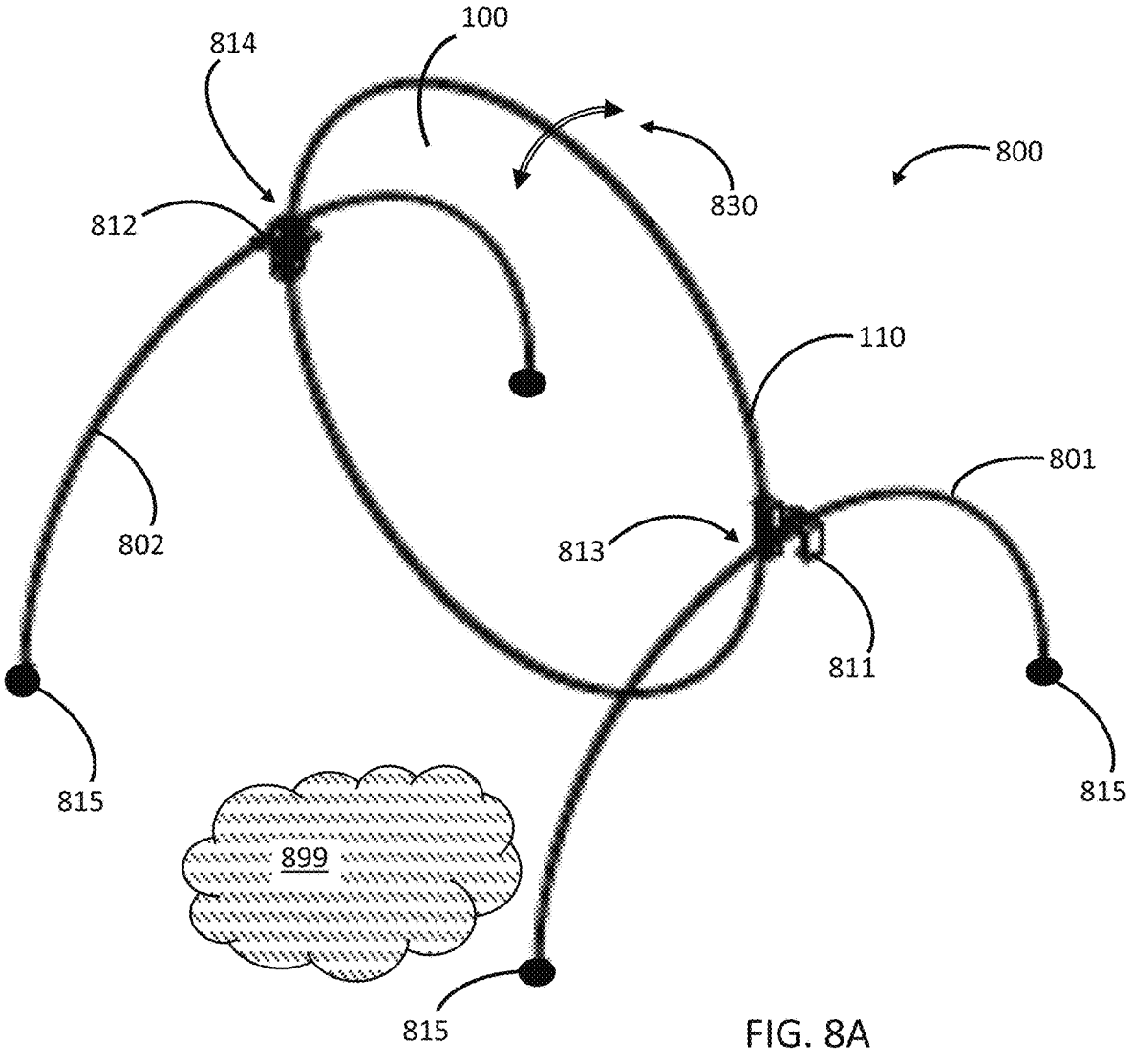
FIGS. 8A, 8B, 8C, and 8D depict top right, right, top, and front perspectives of support structure for a Fresnel lens, according to one or more embodiments described.
Figure 8B:
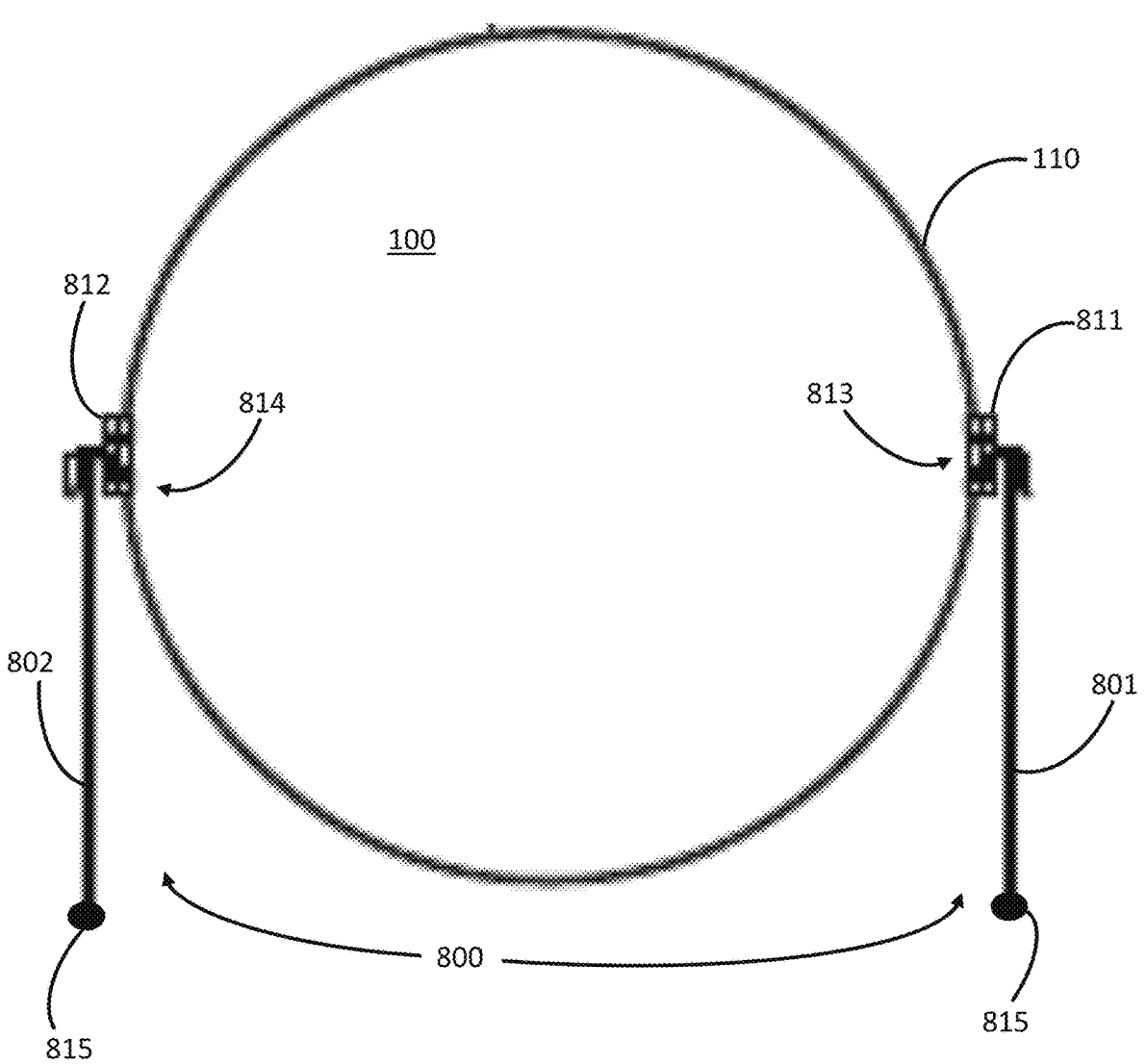
Figure 8C:
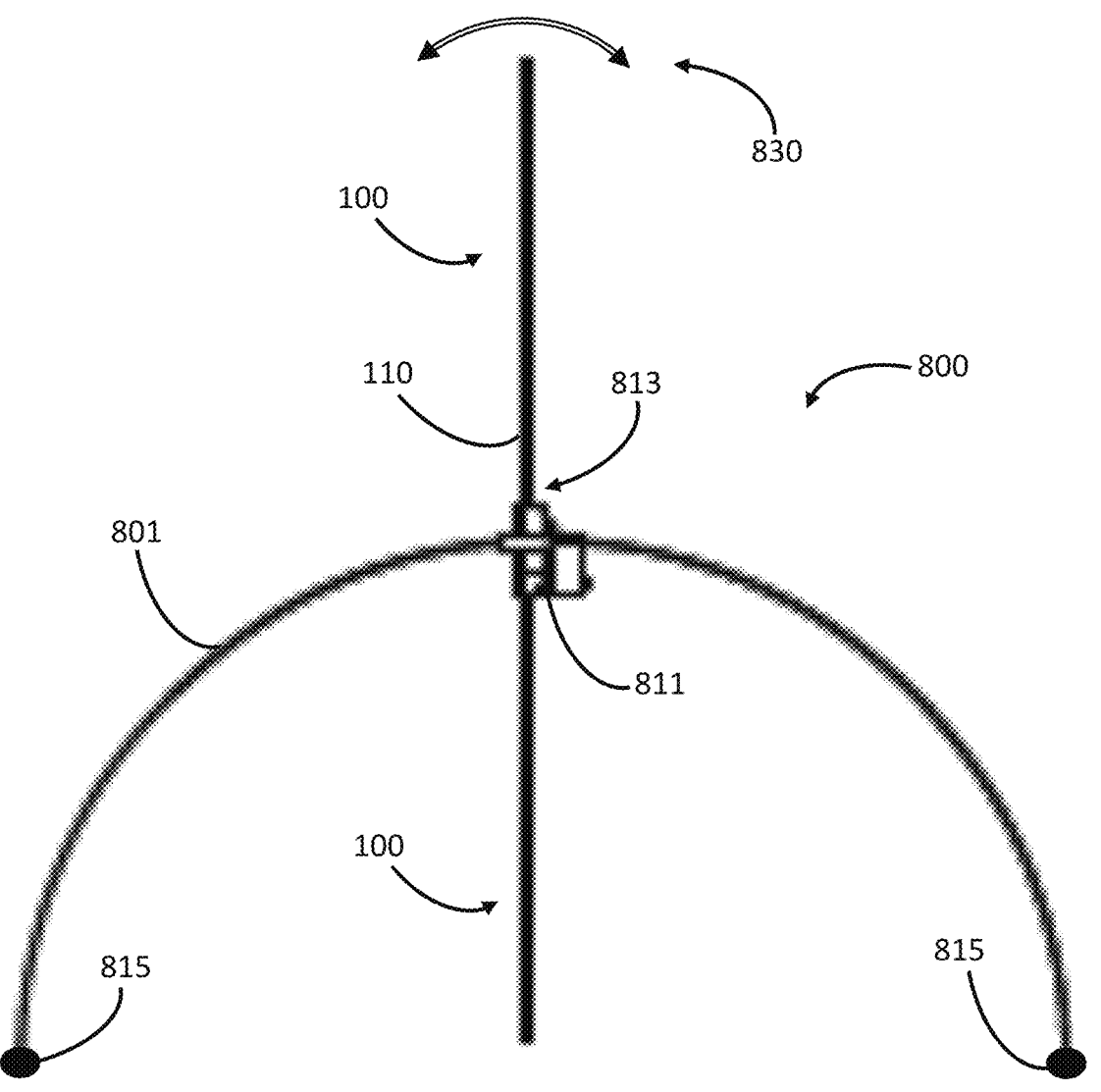
Figure 8D:
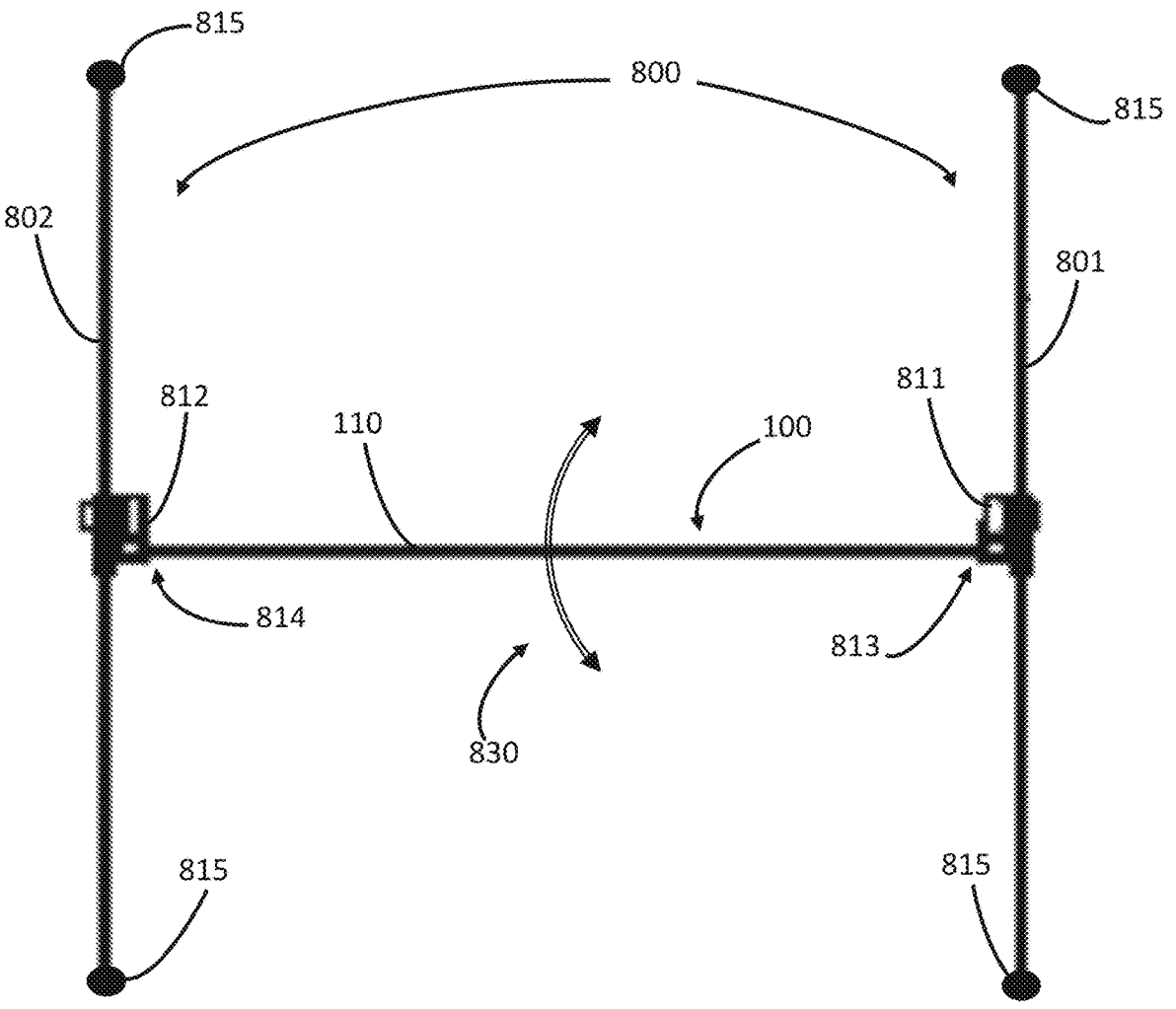
Figures 9A, 9B, 9C:
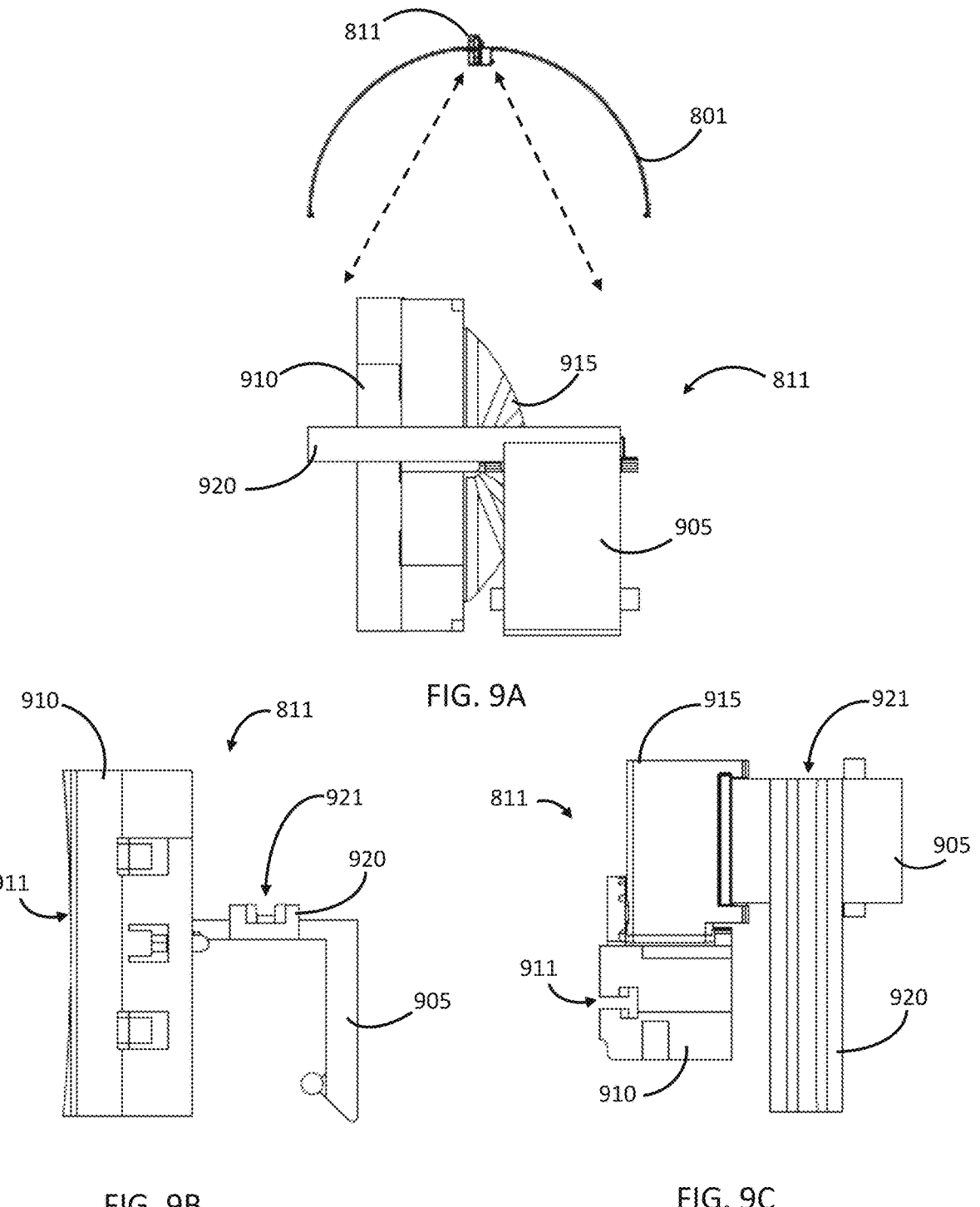
FIGS. 9A, 9B, and 9C depict right, front and top perspectives of support structure for a Fresnel lens, according to one or more embodiments described.

Referring to FIGS. 9A-C, depicted are right (FIG. 9A), front (FIG. 9B), and top (FIG. 9C) perspectives of elements that can be included as part of the right ring clamp 811 and that can be coupled to the half-circle support structure 801 and as part of the support structure 800 for a Fresnel lens 100, according to one or more embodiments described. As illustrated in FIG. 9A, a larger image of the right ring clamp 811 that is shown installed at the center of support structure 801 of FIG. 8C is illustrated. The ring clamp 811 is shown larger (blown up) in FIG. 9A from its location in image taken from right view of support structure 800 shown in FIG. 8C. Referring again to FIGS. 9A-9C, the right ring clamp 811 can be secured to support structure 801 by support structure clip 920. Support structure 801 can be inserted into a first slot 921 formed in the support structure clip 811, where it is held in place. Ratchet arm 910 can be coupled to support structure clip 920 by a ratchet mechanism 915. A second slot 911 can be formed in ratchet arm 910 to receive and hold (i.e., be secured to/by) support structure 801. First slot 921 and second slot 911 can be fabricated or incorporate a semi-hard rubber material so that they can accept and retain the diameter or thickness of the ring bodies associated with support structure 801 and support member 110. It can also be appreciated that additional structure can be used to retain ring bodies within each respective slot. The ratchet arm 915 associated with the ring clamp 811 can enable the Fresnel lens 100 to be rotated at different angles between the support structures 801 and 802. The ratchet arm 915 can then retain the Fresnel lens at a selected angle to enable communications equipment to operate most effectively.

Figure 10C:
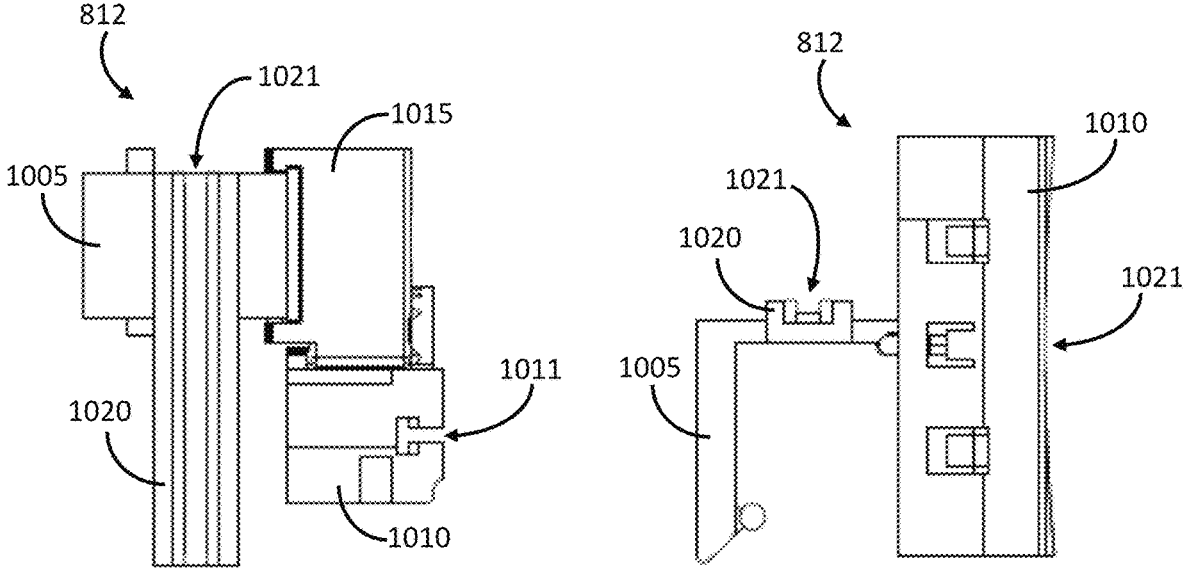
Figure 10C:
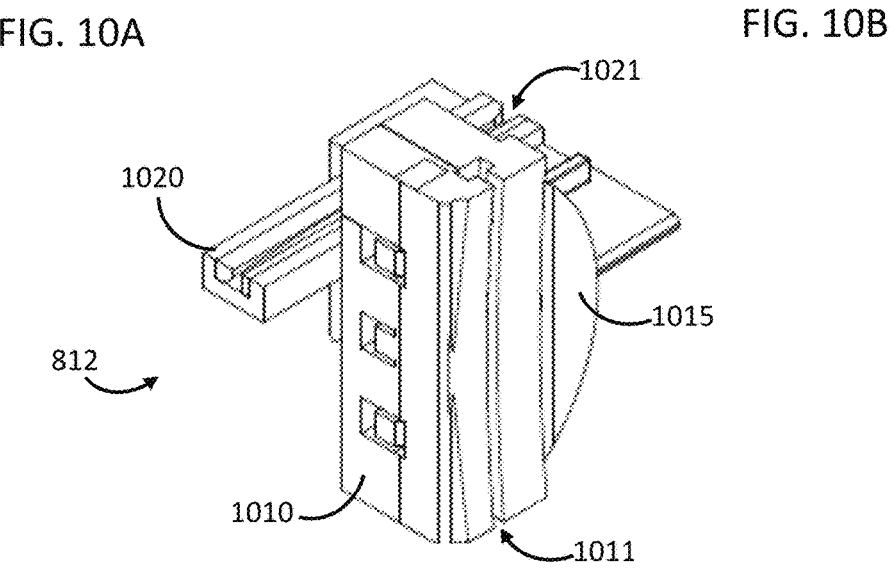

Referring to FIGS. 10A-10C, depicted are top (FIG. 10A), front (FIG. 10B), and top right (FIG. 10C) perspectives of a left ring clamp 812 that can be provided as part of the support structure 800 for a Fresnel lens 100, according to one or more embodiments described. Left ring clamp 812 is similar in design to right ring clamp 811, but is fabricated in reverse so that it compliments operation of the right ring clamp when support Fresnel lens 100, especially with respect to ratchet operation and back and forth rotation of the Fresnel lens 100. Left ring clamp 812 and that can be coupled to the half-circle support structure 802 and as part of the support structure 800 for a Fresnel lens 100, according to one or more embodiments described. The left ring clamp 812 is shown installed at the center of support structure 802 in FIGS. 8A-B. The right ring clamp 812 can be secured to support structure 802 by support structure clip 1020. Support structure 802 can be inserted into a first slot 1021 formed in the support structure clip 812, where it is held in place. Ratchet arm 1010 can be coupled to support structure clip 1020 by a ratchet mechanism 1015. A second slot 1011 can be formed in ratchet arm 1010 to receive and hold (i.e., be secured to/by) support structure 802. First slot 1021 and second slot 1011 can also be fabricated or incorporate a semi-hard rubber material so that they can accept and retain the diameter or thickness of the ring bodies associated with support structure 802 and support member 110. It can also be appreciated that additional structure can be used to retain ring bodies within each respective slot. The ratchet arm 1015 associated with the ring clamp 812 can enable the Fresnel lens 100 to be rotated (see arrow 830 in FIGS. 81, 8C and 8D) at different angles between the support structures 801 and 802. The ratchet arm 1015 can then retain the Fresnel lens at a selected angle to enable communications equipment to operate most effectively.

Referring to FIGS. 11A-11D, depicted are top right (FIG. 11A), front (FIG. 11B), right (FIG. 11C), and top (FIG. 11D) perspectives of a mobile device holder 1100, according to one or more embodiments described. The mobile device holder 1100 can be provided in the form of a screen, like that used for the Fresnel lens 100 (as explained hereinbefore). The mobile device holder 1100 can be configured in a variety of shapes and sizes, like the Fresnel lens 100 can (as also explained hereinbefore). The mobile device holder 1100 in the figures is shown as a circle, but this is not meant to limit the scope of the embodiments. The mobile device holder 1100 can be fabricated with screen material to match the perimeter and shape of the Fresnel lens 100. The mobile device holder can also be formed using nonconductive fabric like that used for the screen of Fresnel lens 100 and can incorporate a spring metal ring as a mobile device holder support member 1110 at the mobile device holder's permitter in the same way that a spring metal ring is incorporated into the perimeter of the Fresnel lens 100 as explained and illustrated in FIG. 2. The purpose of the mobile device holder 1100 is to securely hold a mobile device 1007 at a mobile device retainer 1120 formed at the center of the mobile device holder 1100 and at a select distance away from the Fresnel lens 100. A mobile device 1007 (see FIG. 7) will perform better (receive enhanced signal better) when held near the center, but a short distance away from, the Fresnel lens 100, which is why the mobile device holder 1100 is formed in a conical, or cone-like, shape. To achieve a conical formation for the mobile device holder 1100, conical shape support 1130 can be incorporated into the screen material. The conical shape supports 1130 can be connected at several points (four are shown) with the mobile device holder support member 1110 and can extend towards the center of the mobile device holder 1100. The conical supports 1130 provide the conical shape of the screen material for the mobile device holder. The conical shape support 1130 can connect to the mobile device retainer 1120. The conical shape support 1130 can be made of spring metal material and provided in the form of rods. Plastic material can also be considered for use in fabricating the conical shape supports 1130.

A mobile device 1007 can be left unattended while operating near the Fresnel lens 100 when utilizing the mobile device holder 1100. Use of the mobile device holder would be ideal in situation where, for example, the mobile device 1007 is a portable wireless data communications hotspot that is being used to supply data to other devices (e.g., smartphones, tablets, computers) located near the mobile device 1007. This can be a scenario at a campground or worksite within the field where multiple devices require a data communications connection.

The mobile device retainer 1120 can be provided using a pocket formed at the center using nonconductive material, or with hardware that can securely hold a mobile device 1007 at the center of the mobile device holder 1100. The mobile device holder 1100 can be positioned so that it is held against the surface of the Fresnel lens 100, and so that mobile device holder support member 1110 of the mobile device holder 1100 touches support member 110 of the Fresnel lens 100. The mobile device holder 1100 can be secured to the Fresnel lens 100 at the points of contact between mobile device holder support member 1110 and support member 110. The mobile device holder support member 1110 and support member 110. Can be secured against each other using, for example, clips, hook and loop material (that can be fabricated at the perimeters of each of the Fresnel lens and mobile device holder 1100), buttons, or other fasteners, metallic or nonmetallic. In the situation where a shape of the mobile device holder 1110 and Fresnel lens 100 do not match, attachment can occur where the perimeters touch. Such would be the case where, for example, a circular mobile device holder 1110 is being used with a rectangular Fresnel lens 100, like the Fresnel lens 100 illustrated in FIG. 1.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art. As used herein in the claim(s), when used in conjunction with the word "comprising", the words "a" or "an" mean one or more.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A mobile device holder, comprising:
   a screen having a center and a perimeter;
   a means to retain a mobile device at the center of the screen;
   a mobile device holder support member defining an outer perimeter of the screen; and
   conical shape supports provided in the form of rods and adapted to position the means to retain a mobile device at the center of the screen and away from the Fresnel lens when the mobile device support member is interfaced with the support member;
   wherein the mobile device holder support member is made from spring metal and is configured to interface with a support member associated with a Fresnel lens and position the mobile device near a center of the Fresnel lens.

2. The mobile device holder of claim 1, wherein the screen is collapsible by twisting the mobile device holder support member in opposite screw senses to form interleaved concentric sections.

3. The mobile device holder of claim 1, wherein the screen is provided in the form of at least one of a circle, square, or rectangle.

4. The mobile device holder of claim 1, wherein the screen is made from nonelectromagnetic fabric.

5. The mobile device holder of claim 1, wherein the conical shape supports are made from spring metal.

6. A retaining device for holding mobile device at a center and in front of a Fresnel lens, comprising:

a screen configured as a mobile device support having a center and a perimeter, said screen formed in a conical shape by supports provided in the form of rods and adapted to position a pocket formed at the center of the screen away from the Fresnel lens when the perimeter of the mobile device support is interfaced with a second perimeter associated with a support member associated with the Fresnel lens, wherein the Fresnel lens has a center defined by non-conductive material surrounded by conductive material and the mobile device support and the conical shape supports position the mobile device away from the Fresnel lens when the mobile device support is interfaced with the Fresnel lens.

7. The mobile device holder of claim 6, wherein the screen is collapsible by twisting the mobile device holder support member in opposite screw senses to form interleaved concentric sections.

8. The mobile device holder of claim 6, wherein the screen is provided in the form of at least one of a circle, square, or rectangle.

9. The mobile device holder of claim 6, wherein the screen is made from nonelectromagnetic fabric.

10. The mobile device holder of claim 6, wherein mobile device holder support member is made from spring metal.

11. The mobile device holder of claim 6, wherein the conical shape supports are made from spring metal.

12. The mobile device holder of claim 11, wherein the conical shape supports are provided in the form of rods.

13. A retaining device for holding mobile device in front of a Fresnel lens, comprising:

a screen having a center and a perimeter and being comprised of nonconductive fabric;

a pocket for retaining a mobile device at the center of the screen;

a mobile device holder support member defining an outer perimeter of the screen; and conical shape supports provided in the form of rods and adapted to position the pocket at the center of the screen and away from the Fresnel lens when the mobile device support member is interfaced with the support member associated with the Fresnel lens;

wherein the mobile device holder support member is configured to interfaced with a support member associated with a Fresnel lens and positions the means to retain a mobile device at a center of and away from the Fresnel lens when the mobile device support member is interfaced with the support member.

14. The mobile device holder of claim 13, wherein the screen is collapsible by twisting the mobile device holder support member in opposite screw senses to form interleaved concentric sections.

15. The mobile device holder of claim 13, wherein the screen is provided in the form of at least one of a circle, square, or rectangle.

16. The mobile device holder of claim 13, wherein the screen is made from nonelectromagnetic fabric.

17. The mobile device holder of claim 13, wherein mobile device holder support member and conical shape supports are made from spring metal.

\* \* \* \* \*